United States Patent
Yamamoto et al.

(10) Patent No.: US 11,237,597 B2
(45) Date of Patent: Feb. 1, 2022

(54) ELECTRONIC DEVICE

(71) Applicant: FUJITSU CLIENT COMPUTING LIMITED, Kanagawa (JP)

(72) Inventors: Yasufumi Yamamoto, Kawasaki (JP); Yoshiyuki Sando, Kawasaki (JP); Kenji Suzuki, Kawasaki (JP)

(73) Assignee: FUJITSU CLIENT COMPUTING LIMITED, Kanagawa (JP)

( * ) Notice: Subject to any disclaimer, the term of this patent is extended or adjusted under 35 U.S.C. 154(b) by 0 days.

(21) Appl. No.: 16/933,337

(22) Filed: Jul. 20, 2020

(65) Prior Publication Data
US 2021/0089087 A1    Mar. 25, 2021

(30) Foreign Application Priority Data
Sep. 25, 2019   (JP) .............................. JP2019-174732

(51) Int. Cl.
*G06F 1/16* (2006.01)
(52) U.S. Cl.
CPC .......... *G06F 1/1656* (2013.01); *G06F 1/1626* (2013.01); *G06F 1/1637* (2013.01); *G06F 2200/1631* (2013.01)
(58) Field of Classification Search
CPC .... G06F 1/1626; G06F 1/1637; G06F 1/1656; G06F 2200/1631
See application file for complete search history.

(56) References Cited

U.S. PATENT DOCUMENTS

| | | | | |
|---|---|---|---|---|
| 8,775,710 B1* | 7/2014 | Miller | ................... | G06F 1/1632 710/303 |
| 8,885,337 B2* | 11/2014 | Schanz | ............... | B60R 11/0258 361/679.58 |
| 9,686,878 B2* | 6/2017 | Choi | ....................... | H04W 8/22 |
| 10,158,744 B2* | 12/2018 | Suzuki | ............... | H04M 1/0202 |
| 10,466,807 B1* | 11/2019 | Ferren | ................... | G06F 3/0202 |
| 2001/0048586 A1* | 12/2001 | Itou | ....................... | G06F 1/1626 361/679.55 |

(Continued)

FOREIGN PATENT DOCUMENTS

| JP | 2005-117593 A | 4/2005 |
|---|---|---|
| JP | 2007-128997 A | 5/2007 |

(Continued)

OTHER PUBLICATIONS

Notification of Reasons for Refusal issued in Japanese Patent Application No. 2019-174732, dated Dec. 3, 2019 (15 pages).

*Primary Examiner* — Anthony Q Edwards
(74) *Attorney, Agent, or Firm* — Osha Bergman Watanabe & Burton LLP

(57) ABSTRACT

An electronic device includes a casing and an elastic body. The casing includes: a first wall from which a display screen of a display device is exposed; a second wall that is positioned apart from the first wall in a first direction intersecting the display screen of the first wall; a third wall that extends between the first wall and the second wall; and a fourth wall that extends between the first wall and the second wall. The fourth wall intersects the third wall. The elastic body is disposed at a corner between the third wall and the fourth wall. The elastic body is provided to project out from surfaces of the first wall, the second wall, the third wall, and the fourth wall.

6 Claims, 10 Drawing Sheets

(56) References Cited

U.S. PATENT DOCUMENTS

| | | | |
|---|---|---|---|
| 2012/0154997 A1* | 6/2012 | Shi | G06F 1/1656 361/679.01 |
| 2014/0182926 A1* | 7/2014 | Iwamoto | G06F 1/1626 174/535 |
| 2018/0054903 A1* | 2/2018 | Yamamoto | H05K 5/0008 |
| 2018/0063302 A1* | 3/2018 | Suzuki | H04B 1/3888 |

FOREIGN PATENT DOCUMENTS

| | | |
|---|---|---|
| JP | 2010-067730 A | 3/2010 |
| JP | 6138303 B1 | 5/2017 |
| JP | 6561705 B2 | 8/2019 |

* cited by examiner

FIG.6
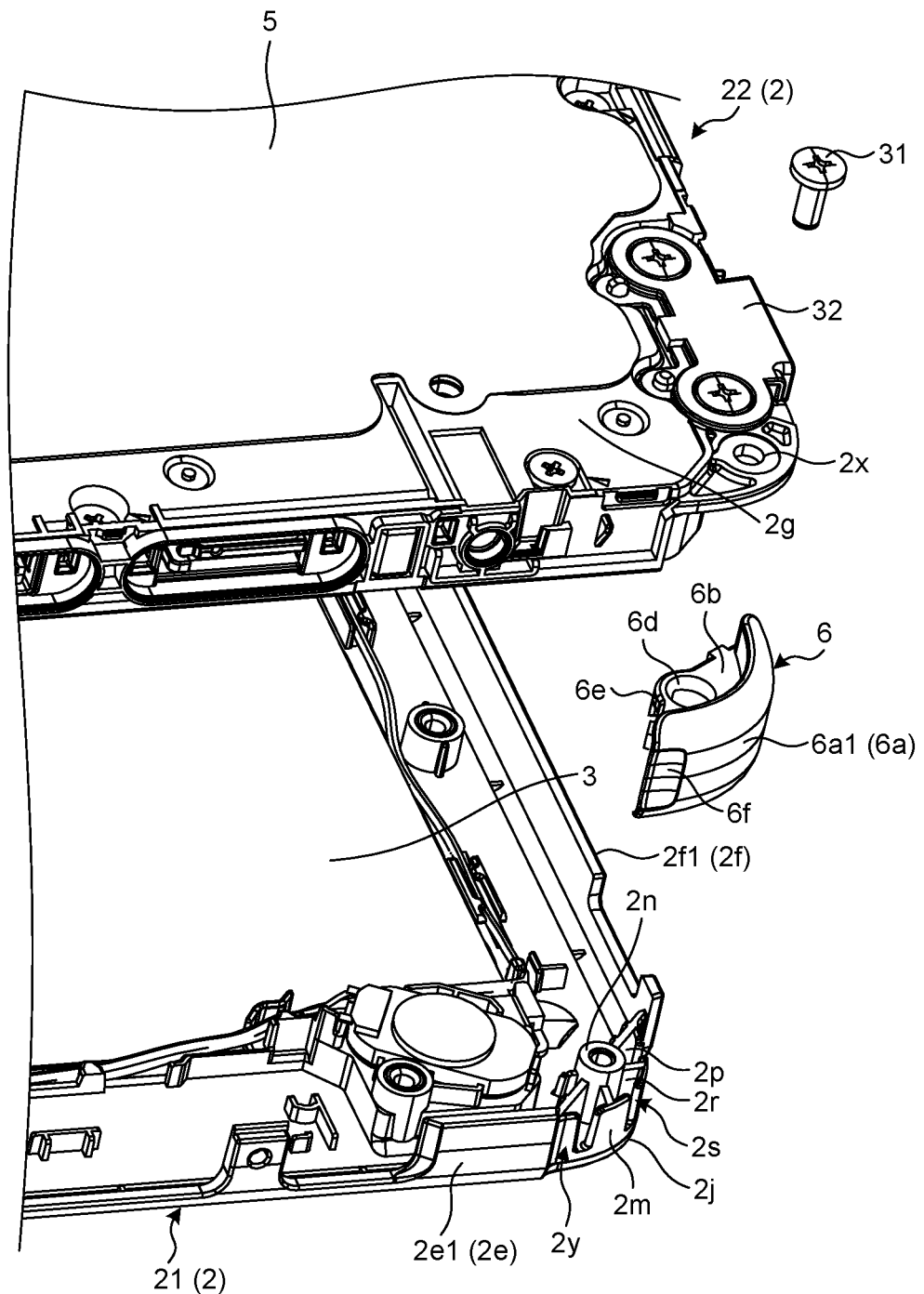
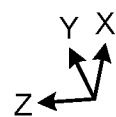

FIG.9
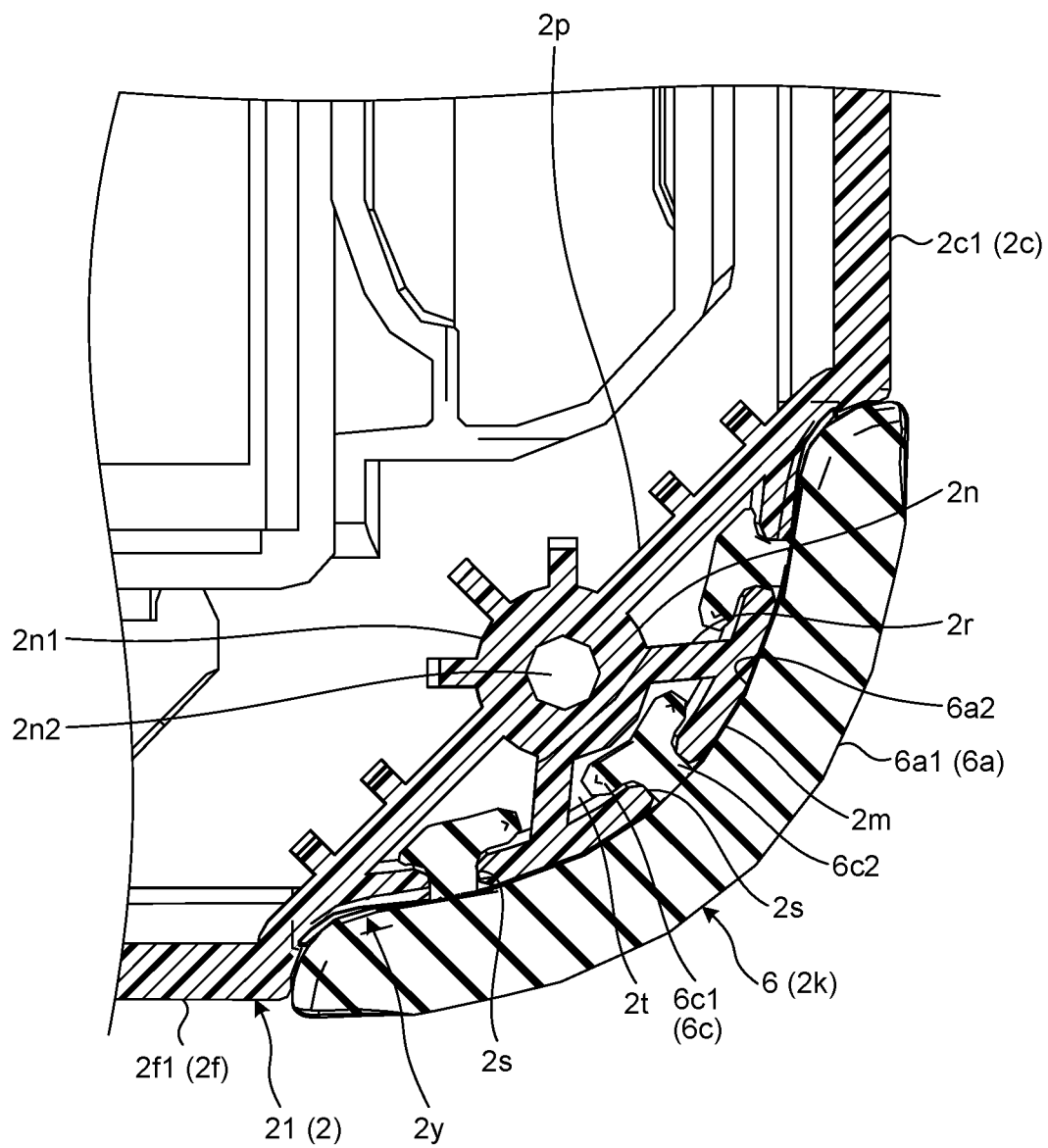
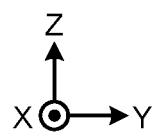

FIG.10
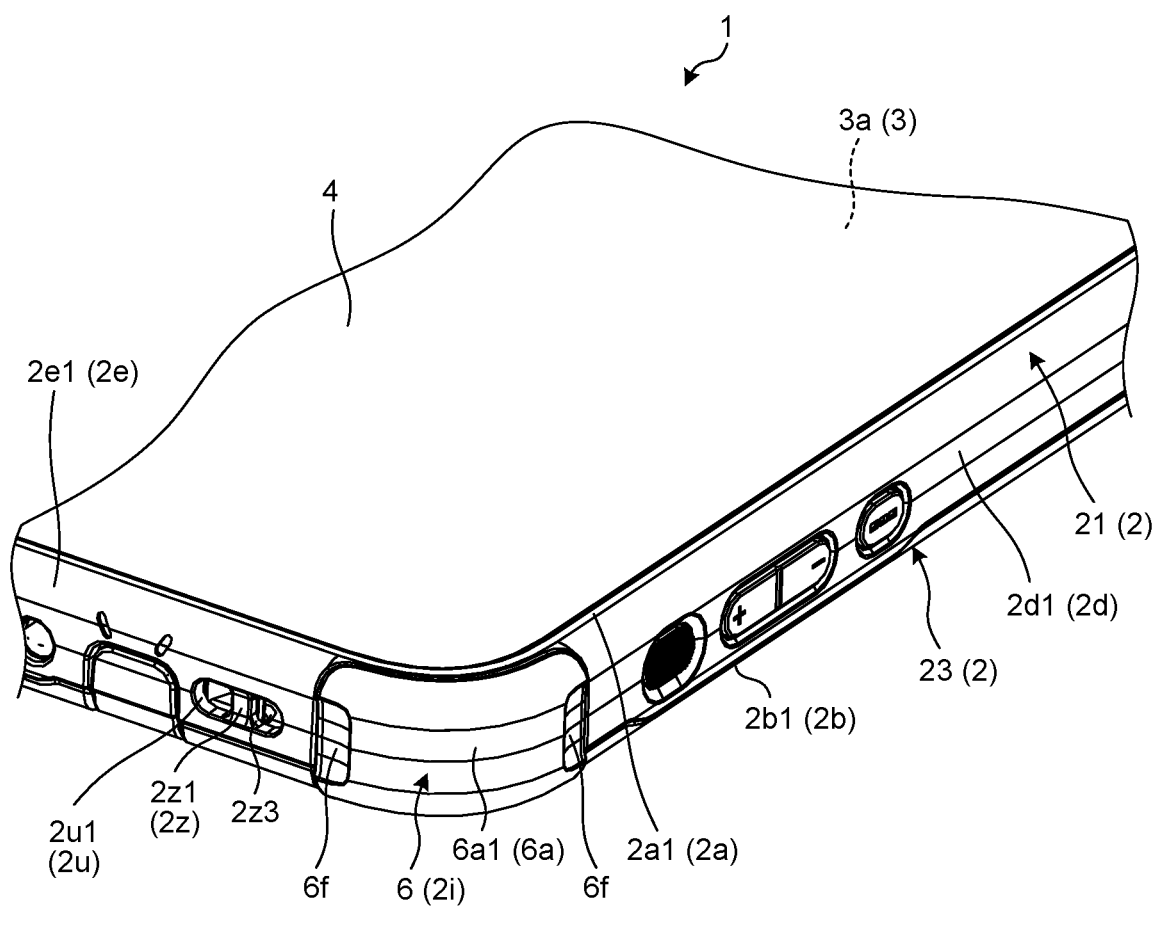
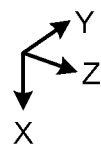

ELECTRONIC DEVICE

CROSS-REFERENCE TO RELATED APPLICATIONS

This application is based upon and claims the benefit of priority from Japanese Patent Application No. 2019-174732, filed on Sep. 25, 2019, the entire contents of which are incorporated herein by reference.

BACKGROUND

Technical Field

Embodiments described herein relate to electronic devices.

Description of the Related Art

With regard to an electronic device, a notebook personal computer has been known, which includes a casing and rubber legs (elastic bodies) that are provided on a base wall of the casing and are capable of coming into contact with an installation surface.

As another electronic device, a tablet personal computer has also been known, which includes a casing and projection members that are provided at corners of the casing and come into contact with an installation surface when the device is dropped on one of the corners.

In such types of electronic devices, a novel structure is beneficial in which improvement has been made so as to alleviate trouble, for example, to enable interference between the casing and the installation surface to be prevented more.

SUMMARY

An electronic device according to an embodiment of the present disclosure includes: a casing that includes a first wall from which a display screen of a display device is exposed, a second wall that is positioned apart from the first wall in a first direction intersecting the display screen of the first wall, a third wall that extends between the first wall and the second wall, and a fourth wall that extends between the first wall and the second wall, the fourth wall intersecting the third wall; and an elastic body that is disposed at a corner between the third wall and the fourth wall, the elastic body being provided to project out from surfaces of the first wall, the second wall, the third wall, and the fourth wall.

BRIEF DESCRIPTION OF THE DRAWINGS

FIG. 6 is an exploded perspective view in the vicinity of a corner in FIG. 5;

FIG. 9 is an exemplary section view of the elastic body according to the embodiment;

FIG. 10 is an enlarged view of the corner in the casing of the electronic device of a line of sight in FIG. 1.

DETAILED DESCRIPTION

According to the present disclosure, it is capable of obtaining the electronic device that has a novel structure in which improvement has been made so as to alleviate trouble, for example, interference between the casing and the installation surface can be further prevented.

An exemplary embodiment of the present disclosure will be described below. Constitutions of the embodiment as well as operations and effects to be brought about by the constitutions will be illustrated below by way of example. The present disclosure may also be achieved by constitutions other than those described in the embodiment below. According to the present disclosure, at least one of various effects (including consequential effects) to be brought about by the constitutions may also be accomplished.

Note that ordinal numbers are used merely to distinguish parts, members, sections, positions, directions, and the like from each other and do not indicate any order or priority in the present specification.

Embodiment

Figure 1:
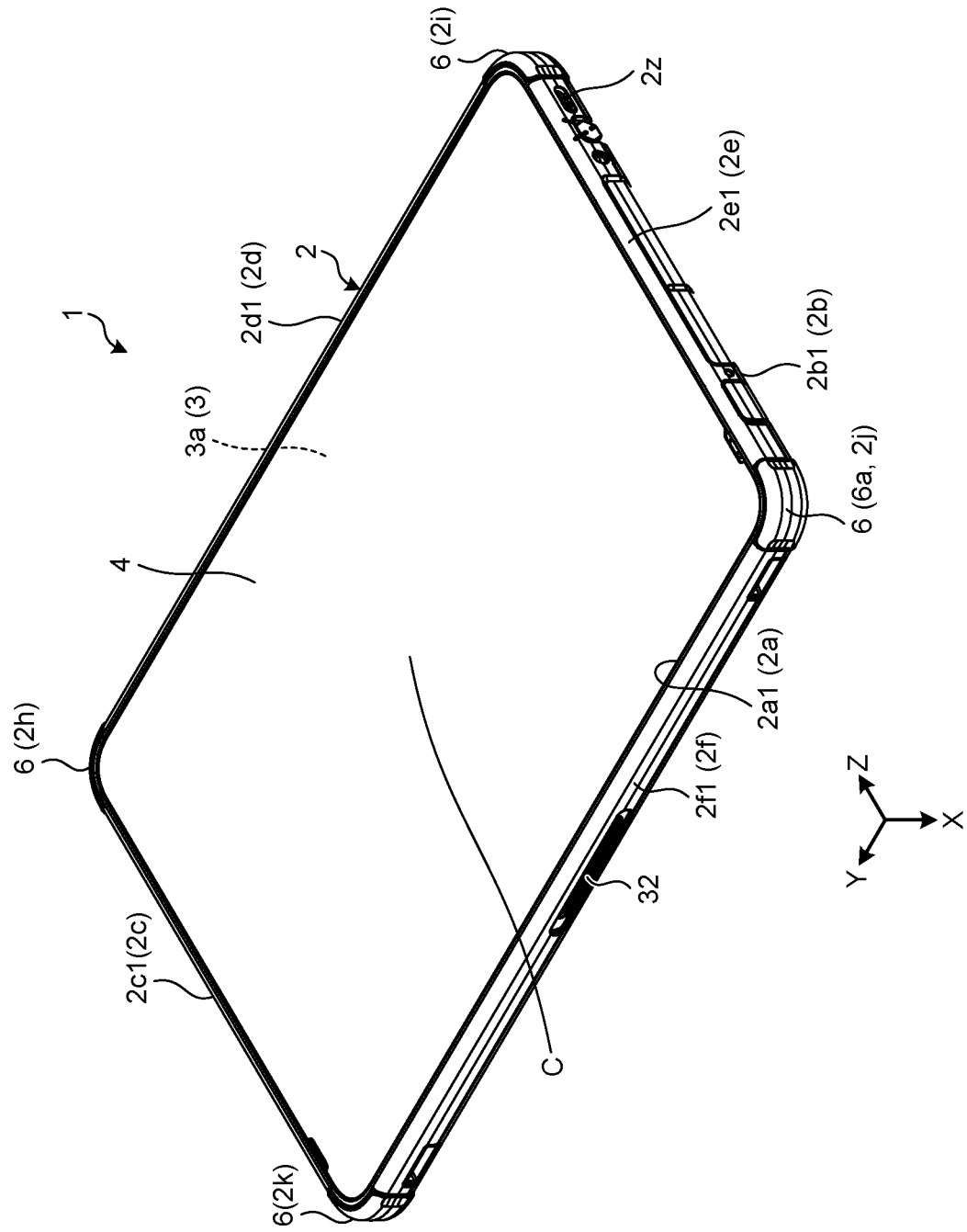
FIG. 1 is an exemplary perspective view of an electronic device according to an embodiment when viewed from the front.
Figure 2:
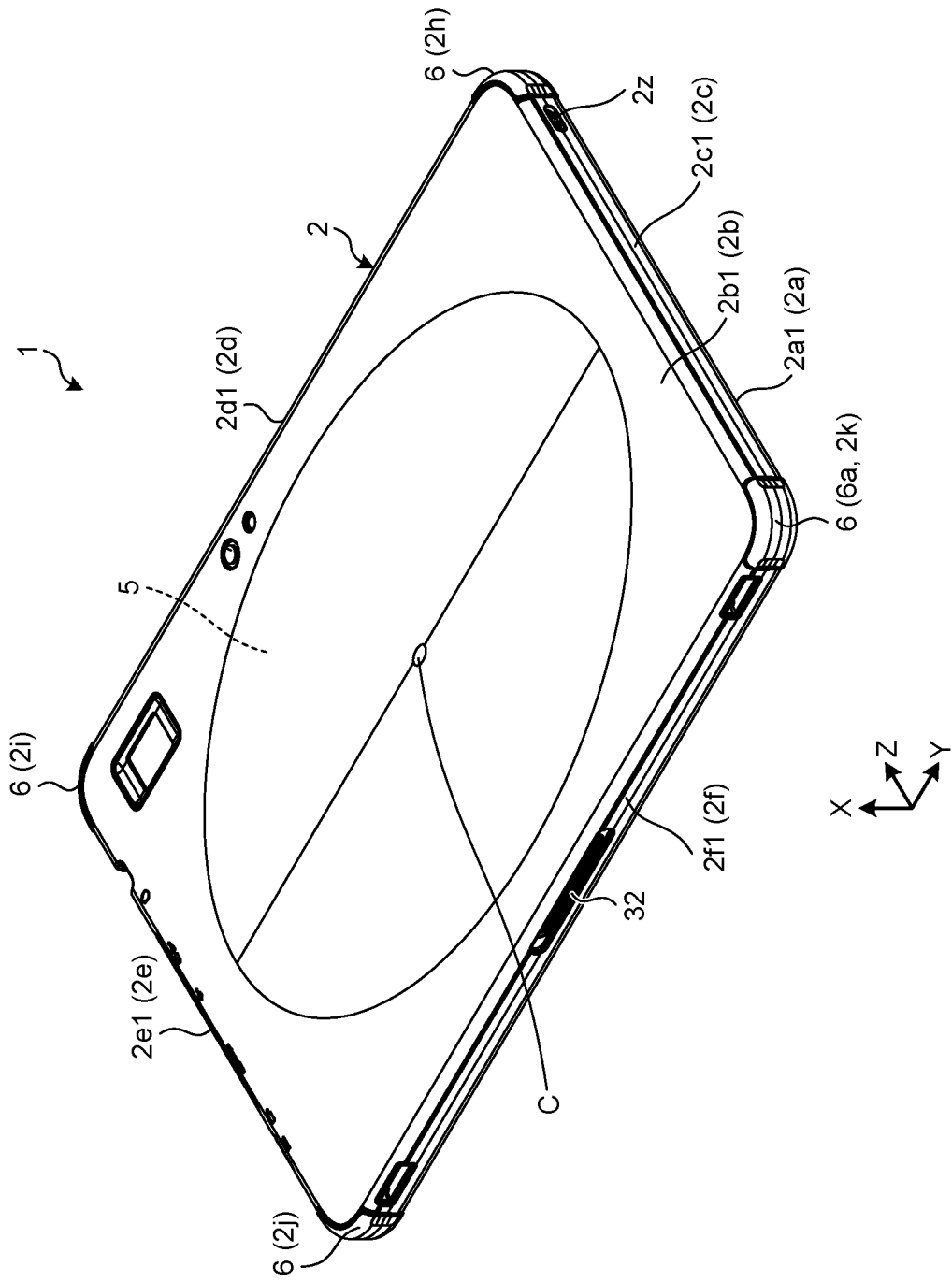
FIG. 2 is an exemplary perspective view of the electronic device according to the embodiment when viewed from the back.

FIG. 1 is a perspective view of an electronic device 1 according to an embodiment when viewed from the front. FIG. 2 is a perspective view of the electronic device 1 when viewed from the back. In the following description, three directions are defined that are orthogonal to each other for the sake of convenience. An X direction extends in the thickness direction (the front-and-back direction) of the electronic device 1, a Y direction extends in the horizontal width direction (the right-and-left direction or the longitudinal direction) of the electronic device 1, and a Z direction extends in the vertical width direction (the upper-and-lower direction or the lateral direction) of the electronic device 1.

In the following description, the X direction may be referred to as the back direction, and a direction opposite to the X direction may be referred to as the front direction. The Y direction may be referred to as the left direction, and a direction opposite to the Y direction may be referred to as the right direction. The Z direction may be referred to as the upper direction, and a direction opposite to the Z direction may be referred to as the lower direction. The X direction is an example of a first direction, and the Y direction is an example of a second direction.

As illustrated in FIGS. 1 and 2, the electronic device 1 is configured as a tablet personal computer, for example. The electronic device 1 includes a casing 2, a display device 3, a touch panel 4, internal components 5, and elastic bodies 6. Note that the electronic device 1 is not limited to this example, and may be a smartphone, a cellular phone, and a game machine, for example. The electronic device 1 is also referred to as a portable information device or the like.

The casing 2 is formed in, for example, a box shape that is a flat rectangular parallelepiped in the X direction. The casing 2 includes a plurality of walls, such as a front wall 2a, a back wall 2b, a left wall 2c, an upper wall 2d, a right wall 2e, and a lower wall 2f. The left wall 2c, the upper wall 2d, the right wall 2e, and the lower wall 2f are each also referred to as a side wall, a surrounding wall, a standing wall, and the like.

The front wall 2a is formed to be a quadrangular frame from which a display screen 3a of the display device 3 is exposed. The back wall 2b is formed to be a quadrangular plate extending in a direction (along a Y-Z plane) orthogonal to the X direction and is positioned apart from the front wall 2a in the X direction. The front wall 2a constitutes a front end of the casing 2, and the back wall 2b constitutes a back end of the casing 2. The front wall 2a is an example of a first wall, and the back wall 2b is an example of a second wall.

The left wall 2c and the right wall 2e both extend in a direction (along an X-Z plane) orthogonal to the Y direction and are provided in parallel with one another with spacing in the Y direction. The left wall 2c extends over the respective ends of the front wall 2a and the back wall 2b in the Y direction. The right wall 2e extends over the respective ends of the front wall 2a and the back wall 2b in the direction opposite to the Y direction. The left wall 2c constitutes a left end of the casing 2, and the right wall 2e constitutes a right end of the casing 2. The left wall 2c and the right wall 2e are each an example of a third wall.

The upper wall 2d and the lower wall 2f both extend in a direction (along an X-Y plane) orthogonal to the Z direction and are provided in parallel with one another with spacing in the Z direction. The upper wall 2d extends over the respective ends of the front wall 2a and the back wall 2b in the Z direction. The lower wall 2f extends over the respective ends of the front wall 2a and the back wall 2b in the direction opposite to the Z direction. The upper wall 2d constitutes an upper end of the casing 2, and the lower wall 2f constitutes a lower end of the casing 2. The upper wall 2d and the lower wall 2f are each an example of a fourth wall.

The left wall 2c, the upper wall 2d, the right wall 2e, and the lower wall 2f are provided with, for example, an operation part such as a power button, a connector 32 for docking the electronic device 1 with peripheral equipment, a hook 2z on which a tether of a touch pen (to be described later) is hooked, and various types of indicator lamps.

The casing 2 includes four corners 2h to 2k. The corner 2h is formed by an intersection part between the left wall 2c and the upper wall 2d. The corner 2i is formed by an intersection part between the upper wall 2d and the right wall 2e. The corner 2j is formed by an intersection part between the right wall 2e and the lower wall 2f. The corner 2k is formed by an intersection part between the lower wall 2f and the left wall 2c. Each of the corners 2h to 2k is shaped to be a rounded corner (corner radius) and is covered by the elastic body 6 (described later).

Figure 3:
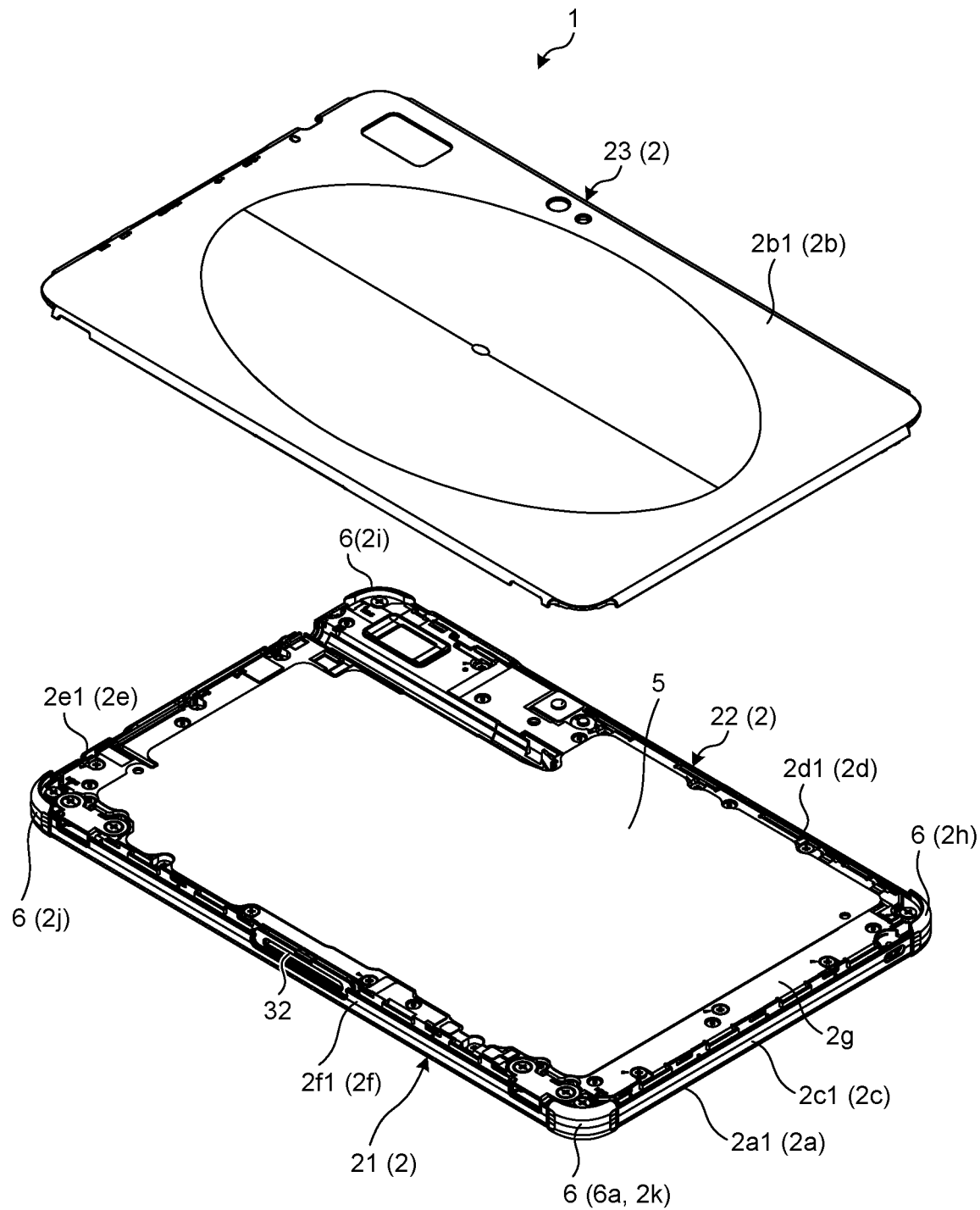
FIG. 3 is an exploded perspective view of a rear cover in a casing of the electronic device of a line of sight in FIG. 2.
Figure 4:
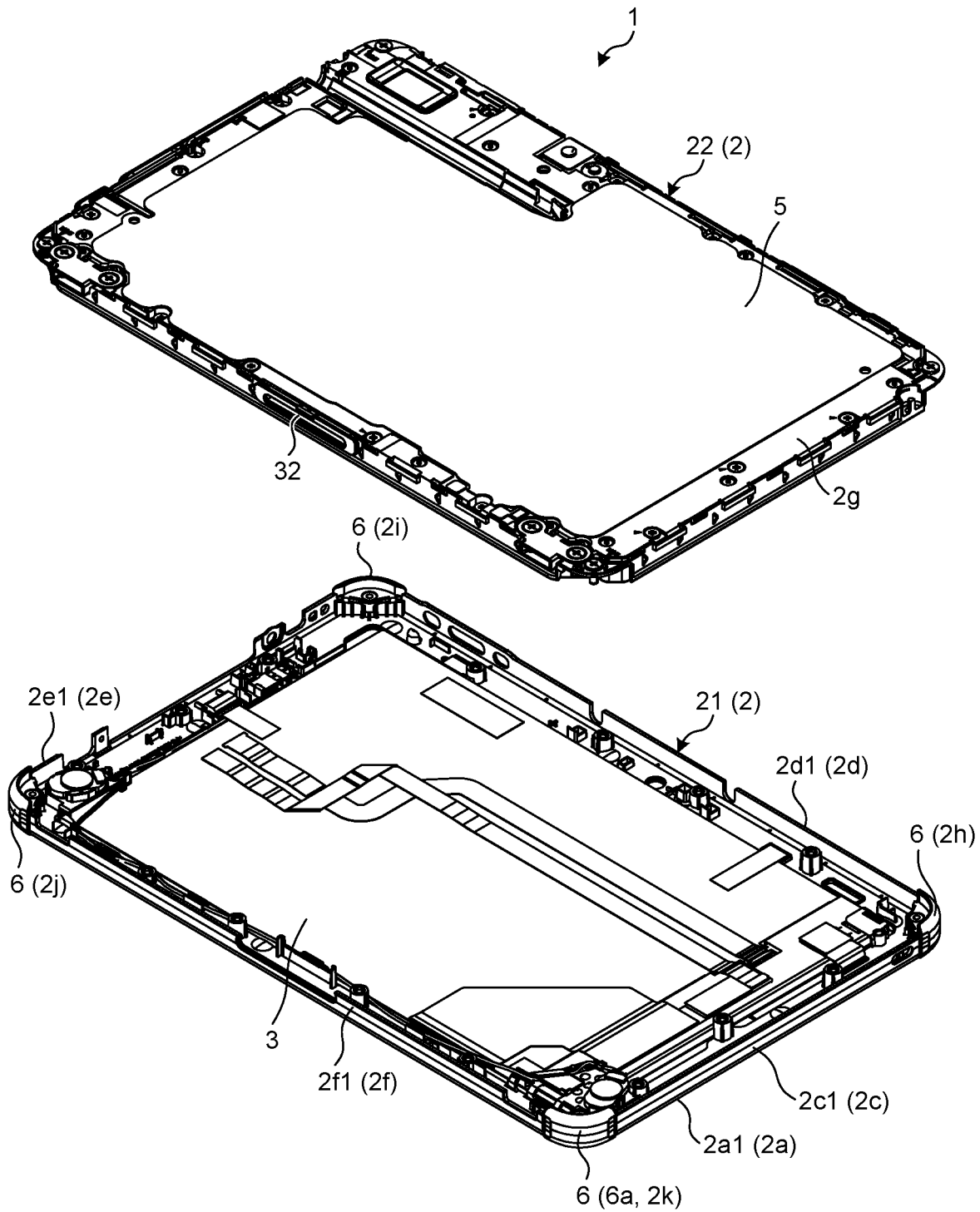
FIG. 4 is an exploded perspective view of a front cover and a middle cover in FIG. 3.

FIG. 3 is an exploded perspective view of a rear cover 23 in the casing 2 of the electronic device 1 of a line of sight in FIG. 2. FIG. 4 is an exploded perspective view of a front cover 21 and a middle cover 22 in FIG. 3. As illustrated in FIGS. 3 and 4, the casing 2 is made up by a combination of a plurality of parts (split bodies), such as the front cover 21, the middle cover 22, and the rear cover 23. The front cover 21, the middle cover 22, and the rear cover 23 are aligned in the X direction.

The rear cover 23 includes the back wall 2b, and respective portions of the left wall 2c, the upper wall 2d, the right wall 2e, and the lower wall 2f, for example. Between the rear cover 23 and the middle cover 22, the internal components 5 are housed. The rear cover 23 is coupled to (integrated with) the front cover 21 and the middle cover 22 by the so-called snap-fits using claws or by coupling fixtures such as screws. The rear cover 23 is an example of a third cover.

The front cover 21 includes the front wall 2a, and respective portions of the left wall 2c, the upper wall 2d, the right wall 2e, and the lower wall 2f, for example. Between the front cover 21 and the middle cover 22, the display device 3 is housed. The front cover 21 is coupled to the middle cover 22 by the so-called snap-fits using claws or by coupling fixtures 31 (see FIG. 6) such as screws. The front cover 21 is an example of a first cover.

The middle cover 22 includes respective portions of the left wall 2c, the upper wall 2d, the right wall 2e, and the lower wall 2f, and a middle wall 2g, for example. The middle wall 2g is positioned between the front wall 2a and the back wall 2b. The middle wall 2g extends between the left wall 2c and the right wall 2e and between the upper wall 2d and the lower wall 2f. The middle wall 2g is in parallel with the back wall 2b and partitions the interior of the casing 2 in the X direction into a space on the internal components 5 side and a space on the display device 3 side. The middle cover 22 is an example of a second cover, and the middle wall 2g is an example of a fifth wall. The middle wall 2g is also referred to as a partition wall or the like.

The display device 3 is, for example, a liquid crystal display (LCD). The display device 3 is formed to be a flat rectangular parallelepiped in the X direction. The display screen 3a (see FIG. 1) of the display device 3 is covered by a transparent part of the touch panel 4. Note that the display device 3 is not limited to this example and may be an organic electroluminescent display (OELD), for example. The touch panel 4 may be configured as the so-called in-cell touch panel that is mounted inside the display device 3, for example.

The internal components 5 are a board and a battery, for example. On the board, a plurality of electronic components, such as a central processing unit (CPU), a read-only memory (ROM), and a random-access memory (RAM) are mounted. Wiring inside the board and these electronic components constitute at least part of a control circuit of the electronic device 1.

Figure 5:
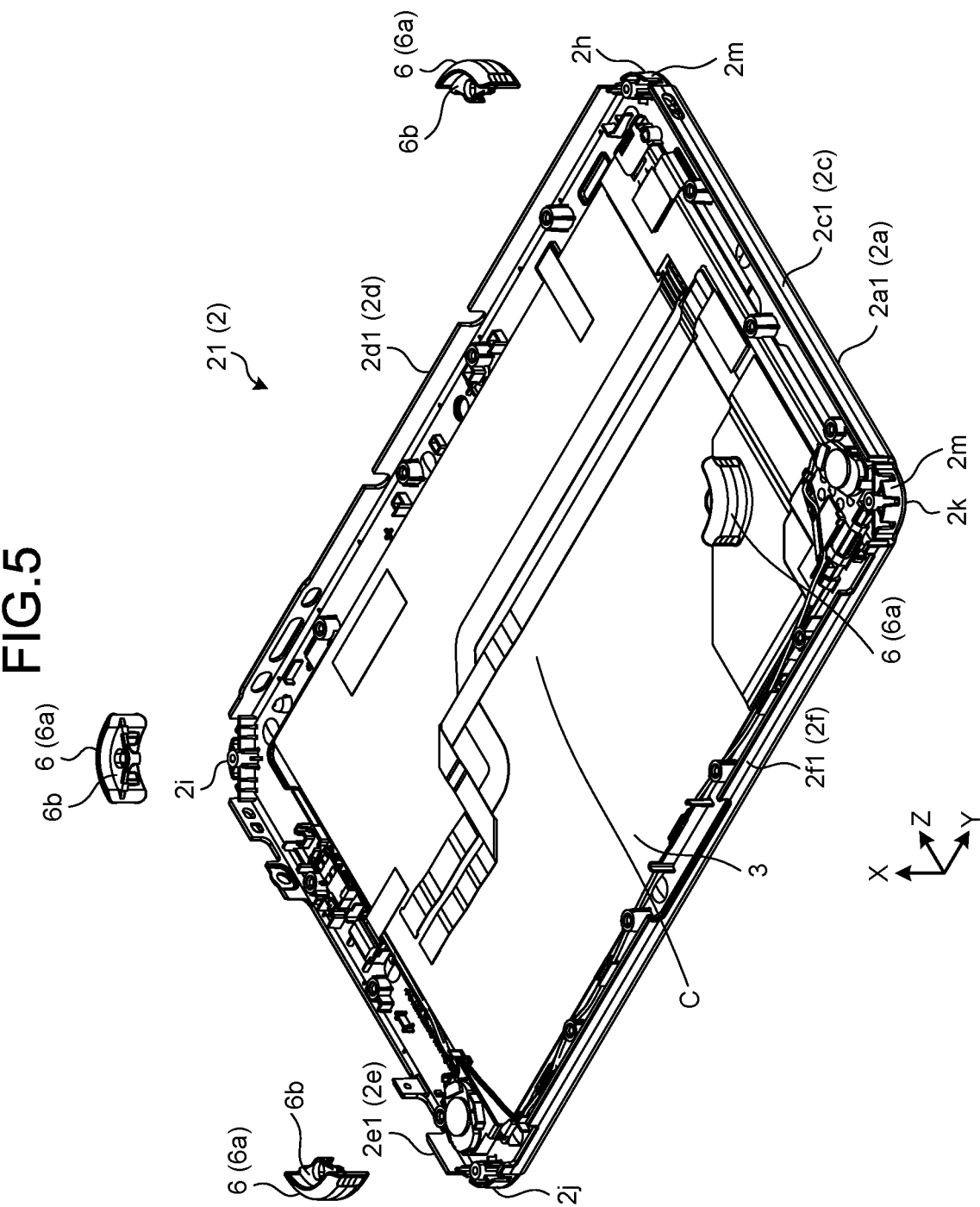
FIG. 5 is an exploded perspective view of an elastic body in the front cover in FIG. 4.

FIG. 5 is an exploded perspective view of the elastic body 6 in the front cover 21 in FIG. 4. FIG. 6 is an exploded perspective view in the vicinity of the corner 2j in FIG. 5. As illustrated in FIGS. 5 and 6, the elastic bodies 6 are attached to the four corners 2h to 2k of the casing 2 in a detachable (separable) manner, for example. Specifically, the elastic bodies 6 are each tightened together (secured) with the middle cover 22 to boss parts 2n of the front cover 21 by the coupling fixtures 31, such as screws, which penetrate openings 2x.

The elastic bodies 6 are made of an elastomer or rubber, for example. The elastic bodies 6 have: a function of preventing interference between an installation surface (not illustrated) on which the electronic device 1 is placed and the casing 2; a function of preventing the casing 2 from slipping or being unstable over the installation surface; and a function of protecting the corners 2h to 2k of the casing 2. The elastic bodies 6 are also referred to as protective members (corner guards), non-slip members, rubber legs, or the like.

The elastic bodies 6 each include a base part 6a and an attaching piece 6b, for example. The base part 6a is formed in an arc shape having a center corresponding to a central part C of the casing 2. In other words, each base part 6a curves outward from the corners 2h to 2k toward a side opposite to the central part C. The base parts 6a cover the corners 2h to 2k from the side opposite to the central part C, that is, the outside of the casing 2. The base parts 6a are also referred to as covers, exposed parts, or the like.

The attaching piece 6b projects out from the base part 6a toward the central part C. The attaching piece 6b includes an opening part 6d through which the coupling fixture 31 and the boss part 2n mentioned above penetrate in the X direction. The elastic bodies 6 are coupled (fixed) to the casing 2 with the respective attaching pieces 6b sandwiched between the front cover 21 and the middle cover 22. The attaching piece 6b is also referred to as an overhanging part, an extended part, a horizontal part, or the like.

Figure 7:
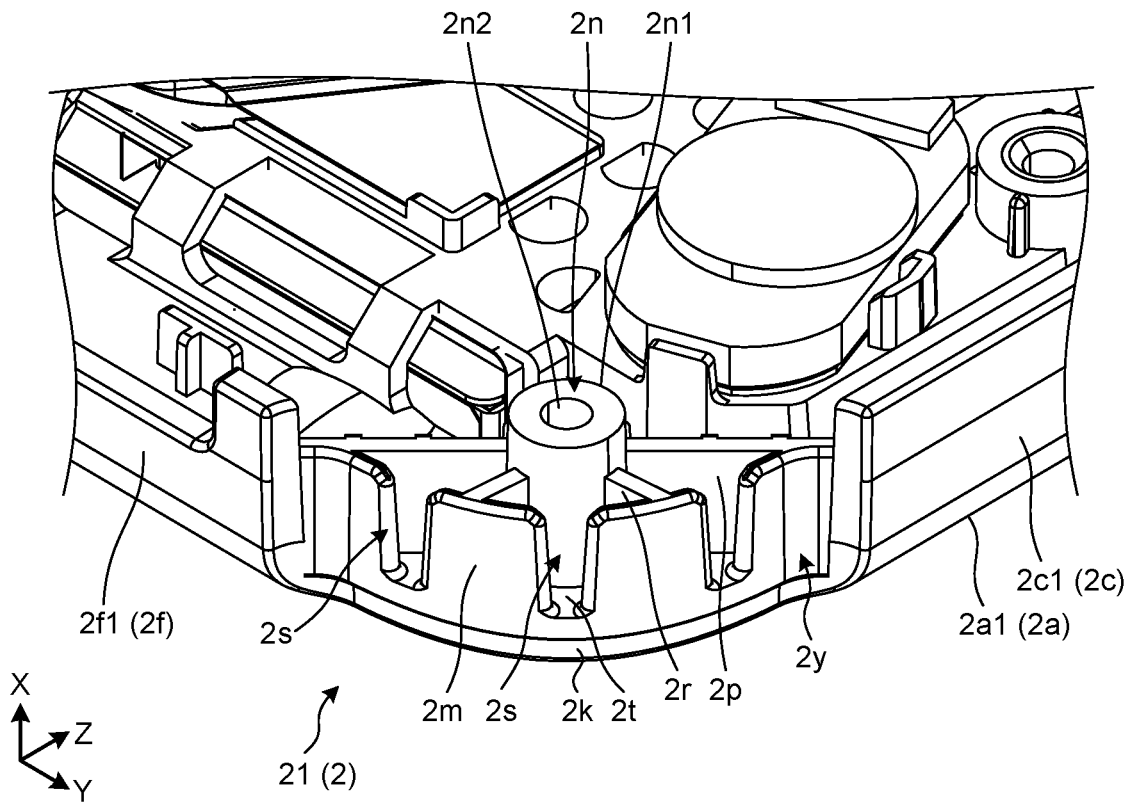
FIG. 7 is an enlarged view of the corner in the front cover in FIG. 5.
Figure 8:
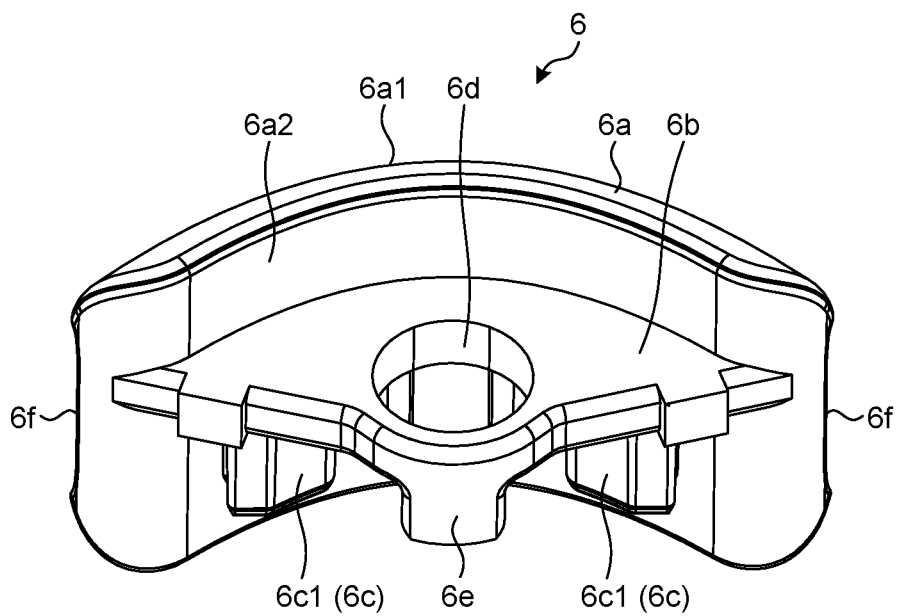
FIG. 8 is an exemplary perspective view of the elastic body according to the embodiment.

Next, an attaching structure of the elastic body 6 will be described in detail. FIG. 7 is an enlarged view of the corner 2k of the front cover 21 in FIG. 5. FIG. 8 is a perspective view of the elastic body 6. FIG. 9 is a section view of the elastic body 6. Note that the structures (shapes) of the corner 2k and the elastic body 6, which is provided on the corner 2k, are the same as the structures (shapes) of the other corners 2h to 2j and the respective elastic bodies 6 that are provided on the corner 2h to 2j.

As illustrated in FIGS. 7 to 9, the corner 2k of the front cover 21 includes a plurality of attaching walls, such as a standing wall 2m, a lib 2p, the boss part 2n, and partition walls 2r. The standing wall 2m, the lib 2p, the boss part 2n, and the partition walls 2r project out from the front wall 2a in the X direction, that is, to the back.

The standing wall 2m is provided to extend between the two walls; the lower wall 2f and the left wall 2c, which forms the corner 2k. The standing wall 2m is formed in an arc shape along the base part 6a of the elastic body 6. That is, the standing wall 2m curves outward from the corner 2k toward a side opposite to the central part C. The standing wall 2m includes a plurality of grooves 2s that are open in the X direction. The grooves 2s are also referred to as slits, notches, or the like.

Between the standing wall 2m, and the lower wall 2f and the left wall 2c, dent parts 2y that dents toward the central part C side. In other words, a surface 2f1 of the lower wall 2f and a surface 2c1 of the left wall 2c project out toward a side opposite to the central part C from a surface of the standing wall 2m. As illustrated in FIG. 9, the elastic body 6 is integrated with the front cover 21 (the casing 2) while the base part 6a blocks (covers) the dent parts 2y. The dent parts 2y are also referred to as steps and the like.

The boss part 2n is positioned apart from the standing wall 2m on the central part C side, that is, inside the casing 2. The boss part 2n is formed in a cylindrical shape and includes an outer peripheral surface 2n1 and an inner peripheral surface 2n2. The inner peripheral surface 2n2 is provided with an internal thread that engages with an external thread of the coupling fixture 31 mentioned above. The boss part 2n projects out in the X direction from the lib 2p and the partition walls 2r. The outer peripheral surface 2n1 at the tip of the boss part 2n faces the inner surface of the opening part 6d in the attaching piece 6b mentioned above.

The lib 2p tilts with respect to the lower wall 2f and the left wall 2c and extends between the lower wall 2f and the boss part 2n, and between the left wall 2c and the boss part 2n. Between the lib 2p and the standing wall 2m, a groove 2t, which is open in the X direction, is provided. The groove 2t links with the side opposite to the central part C of the standing wall 2m (the outside of the casing 2) through the grooves 2s. The groove 2t is also referred to as a housing, a dent part, or the like.

The partition walls 2r extend between the standing wall 2m and the boss part 2n. The front cover 21 is provided with the partition walls 2r that are spaced from one another in a circumferential direction (the longitudinal direction) of the standing wall 2m. The partition walls 2r partitions the groove 2t into a plurality of spaces in the circumferential direction of the standing wall 2m. The groove 2t and the grooves 2s each have an engaging part 6c (FIGS. 8 and 9) of the elastic body 6 engaged therewith.

The engaging part 6c projects out from the base part 6a toward the central part C side (the standing wall 2m side). The engaging part 6c is positioned to be shifted from the attaching piece 6b in the direction opposite to the X direction, on an inner surface 6a2 on the central part C side of the base part 6a, for example. The base part 6a includes the engaging parts 6c that are spaced from one another so as to correspond to positions of the grooves 2s and 2t.

The engaging parts 6c each include a first portion 6c1 and a second portion 6c2 (see FIG. 9), for example. The second portion 6c2 extends from the base part 6a toward the central part C side and penetrates the groove 2s of the standing wall 2m. The first portion 6c1 extends from an end on a side opposite to the base part 6a of the second portion 6c2 along the standing wall 2m. The engaging part 6c is formed by the first portion 6c1 and the second portion 6c2 with the Y-Z section orthogonal to the X direction having a substantially T shape.

The engaging parts 6c engage with the grooves 2s and 2t of the standing wall 2m from the X direction. The first portion 6c1 faces the peripheries of the grooves 2s in the standing wall 2m with the engaging part 6c engaging with the grooves 2s and 2t. In other words, the standing wall 2m is sandwiched between the base part 6a and the first portion 6c1. By this structure, the elastic body 6 is restricted from moving to the side opposite to the central part C with respect to the front cover 21.

The elastic body 6 includes a projecting part 6e (FIGS. 6 and 8). The projecting part 6e projects out from the periphery of the opening part 6d in the attaching piece 6b in the direction opposite to the X direction. The projecting part 6e reinforces a part of the attaching piece 6b that is thinned due to the opening part 6d. The projecting part 6e is supported by the outer peripheral surface 2n1 of the boss part 2n in a state where the elastic body 6 is attached to the front cover 21.

The elastic body 6 is provided with dent parts 6f (FIGS. 6 and 10). The dent parts 6f dent from an outer surface 6a1 on a side opposite to the inner surface 6a2 of the base part 6a toward the central part C side. The dent parts 6f are provided at both ends in a circumferential direction (the longitudinal direction) of the base part 6a. The dent parts 6f is able to function as clearance grooves for peripheral equipment, such as a cradle, to be connected to the connector 32 (see FIG. 1), for example.

In the present embodiment, in a state where the elastic body 6 is attached to the casing 2, the base part 6a projects out toward the side opposite to the central part C (the outside of the casing 2) from respective surfaces 2c1, 2d1, 2e1, and 2f1 of the left wall 2c, the upper wall 2d, the right wall 2e, and the lower wall 2f do. Additionally, the base part 6a projects out in the direction opposite to the X direction from a surface 2a1 of the front wall 2a, and also projects out in the X direction from a surface 2b1 of the back wall 2b. Therefore, interference is prevented between the casing 2 and the installation surface (not illustrated) on which the electronic device 1 is placed.

Figure 11:
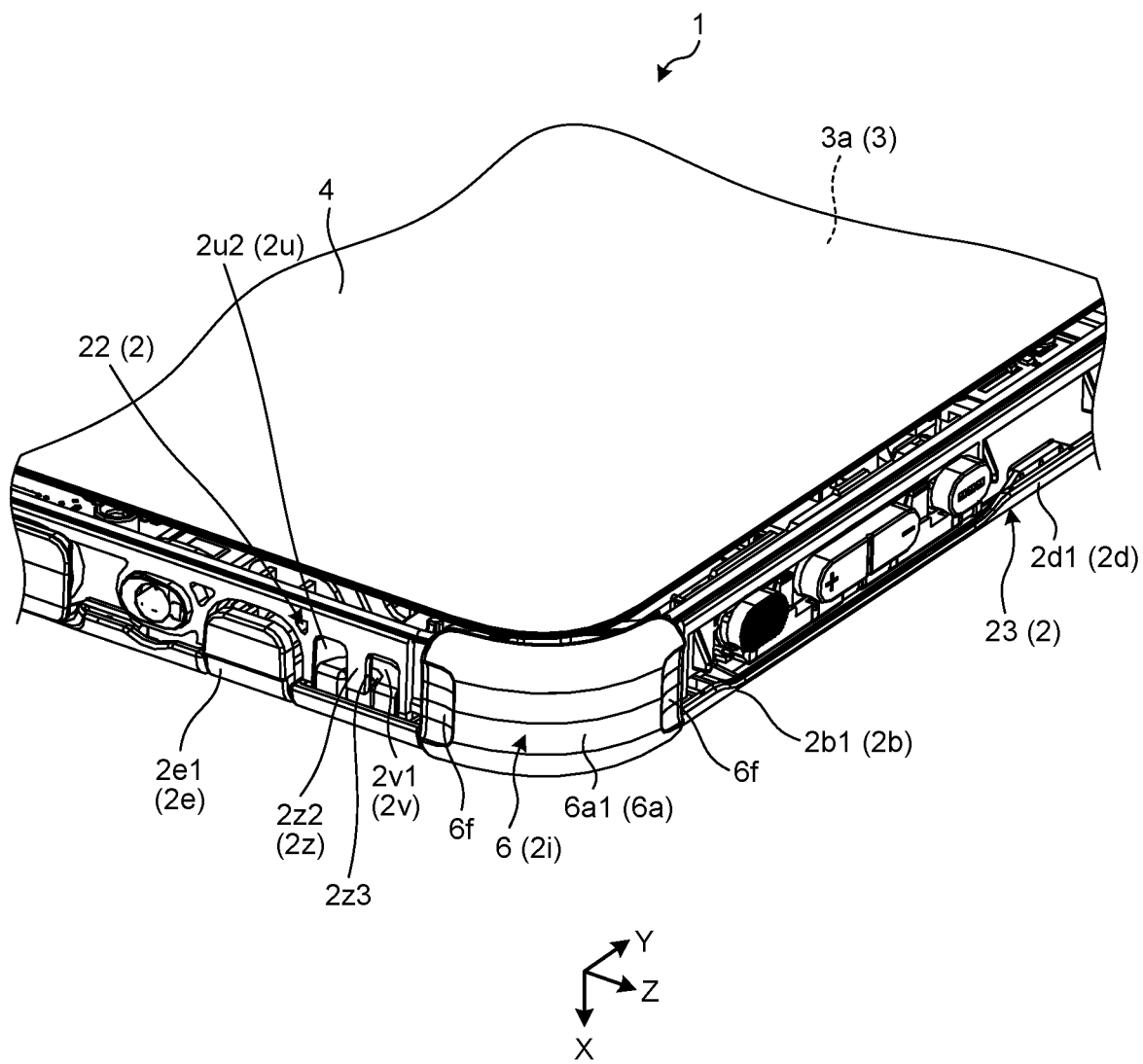
FIG. 11 is a view in a state in which the front cover in the casing of the electronic device in FIG. 10 is removed.

FIG. 10 is an enlarged view of the corner 2i of the casing 2 in FIG. 1. FIG. 11 is a view in a state in which the front cover 21 of the casing 2 in FIG. 10 is removed. As illustrated in FIGS. 10 and 11, the hook 2z, on which a tether of a touch pen (not illustrated) is hooked, is provided in the right wall 2e of the casing 2. Note that the structure (shape) of the hook 2z is the same as the structure (shape) of the hook 2z provided in the left wall 2c.

The right wall 2e is provided with an opening part 2u that constitutes a portion of the hook 2z, for example. The opening part 2u includes a through hole 2u1 provided in the front cover 21 and a dent part 2u2 provided in the middle cover 22 (see FIG. 11), for example. The dent part 2u2 is aligned with the through hole 2u1 in the Y direction. The dent part 2u2 dents in the Y direction and is open in the direction opposite to the Y direction.

The hook 2z includes a first portion 2z1 (see FIG. 10) and a second portion 2z2 (see FIG. 11). The first portion 2z1 is provided in the front cover 21 and extends over the inner surface of the through hole 2u1 in the X direction. The second portion 2z2 is provided in the middle cover 22 and extends from the inner surface of the dent part 2u2 in the X direction.

The second portion 2z2 is positioned to overlap with the first portion 2z1 in the Y direction. Thus, the first portion 2z1 of the hook 2z is reinforced, which in turn makes it easier to increase the rigidity and strength thereof against a load imposed on the hook 2z by the tether. The first portion 2z1 is also referred to as a first strut, and the second portion 2z2 is also referred to as a second strut.

The rear cover 23 includes a seat part 2v. The seat part 2v projects out from the back wall 2b in the direction opposite to the X direction and is inserted in the dent part 2u2. The seat part 2v includes a surface 2v1 that is along the back wall 2b and faces the dent part 2u2. The surface 2v1 supports the tether inserted in the opening part 2u.

In the present embodiment, the surface 2v1 of the seat part 2v is positioned alongside an end part 2z3 of the hook 2z on the back wall 2b side in the Y direction. By this structure, the tether is prevented from getting into the back wall 2b side further than the surface 2v1. The surface 2v1 is also referred to as a receiving surface, a supporting surface, a seating surface, or the like.

As described above, in the present embodiment, the electronic device 1 includes the elastic bodies 6 that are provided at the corners 2h to 2k of the casing 2. The elastic bodies 6 are provided to project out from the respective surfaces 2a1 to 2f1 of the front wall 2a (first wall), the back wall 2b (second wall), the left wall 2c (third wall), the upper wall 2d (fourth wall), the right wall 2e (third wall), and the lower wall 2f (fourth wall).

With this structure, the elastic bodies 6 is able to prevent more easily interference between the installation surface on which the electronic device 1 is placed and the casing 2, for example. Therefore, in whichever position the electronic device 1 may be placed, out of a plurality of positions in which one of the front wall 2a, the back wall 2b, the left wall 2c, the upper wall 2d, the right wall 2e, and the lower wall 2f faces the installation surface, it is possible to prevent the electronic device 1 from slipping or being unstable over the installation surface, for example. Additionally, in whichever position the electronic device 1 may be dropped on the installation surface, the elastic bodies 6 can more easily come into contact with the installation surface, which in turn makes it easier to increase the protection property of the casing 2 and the touch panel 4, for example.

In the present embodiment, the casing 2 includes the front cover 21 (first cover) including at least the front wall 2a, and the middle cover 22 (second cover) positioned apart from the front cover 21 in the X direction. The elastic bodies 6 includes the respective base parts 6a covering the corners 2h to 2k, and the respective attaching pieces 6b that project out from the base parts 6a toward the central part C side of the casing 2. The attaching pieces 6b are sandwiched between the front cover 21 and the middle cover 22.

With this structure, it is possible to attach the elastic bodies 6 between the front cover 21 and the middle cover 22 by using the attaching pieces 6b projecting out from the base parts 6a. Additionally, the base parts 6a and the attaching pieces 6b increase the section modulus of the elastic bodies 6, which in turn makes it easier to ensure the rigidity and strength of the elastic bodies 6 even when the elastic bodies 6 and the casing 2 are formed to be separate bodies (molded separately), for example. Suppose the middle cover 22 is sandwiched between the attaching pieces 6b and the front cover 21, the bearing surfaces of the heads of the coupling fixtures 31 need to have a relatively large area in order to prevent the coupling fixtures 31 from damaging the attaching pieces 6b. In this respect, according to the present embodiment, the attaching pieces 6b are sandwiched between the front cover 21 and the middle cover 22, so that the attaching pieces 6b do not need to be provided with the bearing surfaces of the heads having a large area, which in turn can further decrease the amount of the attaching pieces 6b projecting out toward the central part C side.

In the present embodiment, the front cover 21 includes the grooves 2s and 2t that are open in the X direction. The elastic bodies 6 include the respective engaging parts 6c that engage with the grooves 2s and 2t and that is hooked onto the front cover 21 on the side opposite to the central part C.

With this structure, engagement of the engaging parts 6c with the grooves 2s and 2t restricts the elastic bodies 6 from moving to the side opposite to the central part C with respect to the front cover 21, which in turn can prevent the elastic bodies 6 from coming off the casing 2, for example.

In the present embodiment, the front cover 21 includes the boss parts 2n that project out from the front wall 2a in the X direction. The attaching pieces 6b includes the respective openings 6d through which the boss parts 2n penetrate in the X direction.

With this structure, the boss parts 2n come into contact with the inner surfaces of the opening parts 6d, thereby restricting the elastic bodies 6 from moving in the direction (YZ plane) intersecting the X direction with respect to the front cover 21, which in turn can further prevent the elastic bodies 6 from coming off the casing 2, for example. Additionally, the coupling fixtures 31 that are fastened to the respective boss parts 2n can be used to tighten the elastic bodies 6 while the attaching pieces 6b are sandwiched between the front cover 21 and the middle cover 22, for example.

In the present embodiment, the elastic bodies 6 includes the respective projecting parts 6e that project out from the peripheries of the opening parts 6d in the attaching pieces 6b in the direction opposite to the X direction.

With this structure, the projecting parts 6e can reinforce the peripheries of the opening parts 6d, for example. Thus, the rigidity and strength of the attaching pieces 6b are increased more easily, for example. Additionally, the projecting parts 6e come into contact with the respective outer peripheral surfaces 2n1 of the boss parts 2n, which can further prevent the elastic bodies 6 from coming off the casing 2 to a side opposite to the central part C, for example.

In the present embodiment, the elastic bodies 6 have the respective dent parts 6f that dent, toward the central part C side, from the outer surfaces 6a1 of the base parts 6a on the side opposite to the central part C.

With this structure, a user puts the fingers on the dent parts 6*f* provided in the outer surfaces 6*a*1, thereby enabling the user to lift the electronic device 1 placed on the installation surface more easily, for example. Additionally, the dent parts 6*f* can prevent interference between the casing 2 and peripheral equipment docked onto the casing 2, for example.

In the present embodiment, the front cover 21 includes the right wall 2*e* and the first portion 2*z*1. The first portion 2*z*1 is provided in the right wall 2*e* and constitutes a portion of the hook 2*z* on which the tether is hooked. The middle cover 22 includes the second portion 2*z*2 that constitutes part of the hook 2*z* and that overlaps with the first portion 2*z*1 in the Y direction (second direction) intersecting the right wall 2*e*.

With this structure, the second portion 2*z*2 of the middle cover 22 can reinforce the first portion 2*z*1 of the hook 2*z*, for example. Thus, the rigidity and strength against a load imposed on the hook 2*z* by the tether can be increased more easily, for example.

In the present embodiment, the casing 2 includes the rear cover 23 (third cover) including the back wall 2*b* and the seat part 2*v*. The seat part 2*v* includes the surface 2*v*1 that extends along the back wall 2*b* and is provided alongside the end part 2*z*3 of the hook 2*z* on the back wall 2*b* side in the Y direction.

With this structure, the tether is prevented from getting into the back wall 2*b* side further than the surface 2*v*1 (the hook 2*z*), which in turn more easily saves time and effort to attach and detach the tether to and from the hook 2*z*, for example.

While certain embodiments have been described, these embodiments have been presented by way of example only and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. An electronic device comprising:
   a casing that includes:
      a first wall from which a display screen of a display device is exposed,
      a second wall that is positioned apart from the first wall in a first direction intersecting the display screen of the first wall,
      a third wall that extends between the first wall and the second wall, and
      a fourth wall that extends between the first wall and the second wall, the fourth wall intersecting the third wall; and
   an elastic body that is disposed at a corner between the third wall and the fourth wall, the elastic body being provided to project out from surfaces of the first wall, the second wall, the third wall, and the fourth wall, wherein
   the casing further includes:
      a first cover that includes the first wall, and
      a second cover that is positioned apart from the first cover in the first direction,
   the elastic body includes:
      a base part that covers the corner, and
      an attaching piece that projects out from the base part toward a central part of the casing, the attaching piece being sandwiched between the first cover and the second cover,
   the first cover includes:
      the third wall, and
      a first portion that is provided in the third wall and constitutes part of a hook on which a tether is hooked,
   the second cover includes a second portion that constitutes part of the hook and overlaps with the first portion in a second direction intersecting the third wall, and
   the casing further includes a third cover that includes:
      the second wall, and
      a seat part including a surface that extends along the second wall and is provided alongside an end of the hook on a side of the second wall in the second direction.

2. The electronic device according to claim 1, wherein the first cover includes a groove that is open in the first direction, and
   the elastic body includes an engaging part that engages with the groove and is hooked onto the first cover on a side opposite to the central part of the casing.

3. The electronic device according to claim 1, wherein the first cover includes a boss part that projects out from the first wall in the first direction, and
   the attaching piece includes an opening part through which the boss part penetrates in the first direction.

4. The electronic device according to claim 3, wherein the elastic body further includes a projecting part that projects out from a periphery of the opening part in the attaching piece in a direction opposite to the first direction.

5. The electronic device according to claim 1, wherein the elastic body further includes a dent part that dents, toward the central part of the casing, from an outer surface of the base part on a side opposite to the central part of the casing.

6. An electronic device comprising:
   a casing that includes:
      a first wall having a shape of a quadrangular frame from which a display screen of a display device is exposed,
      a second wall having a shape of a plate and being positioned apart from the first wall in a first direction orthogonal to the display screen of the first wall,
      a pair of third walls being spaced apart from one another and extending between the first wall and the second wall, and
      a pair of fourth walls being spaced apart from one another, extending between the first wall and the second wall, and intersecting the pair of third walls, wherein the pairs of third and fourth walls constitute a surrounding wall of the electric device; and
   elastic bodies each being disposed at a corner between the corresponding third and fourth walls and projecting out from surfaces of the first wall, the second wall, and the corresponding third and fourth walls.

* * * * *